Jan. 28, 1969   F. T. CHAK MA   3,424,448
SPRINGS AND/OR SHOCK ABSORBERS
Filed June 6, 1966

Inventor
FRANCIS TIN CHAK MA

By Irwin S. Thompson
Attorney

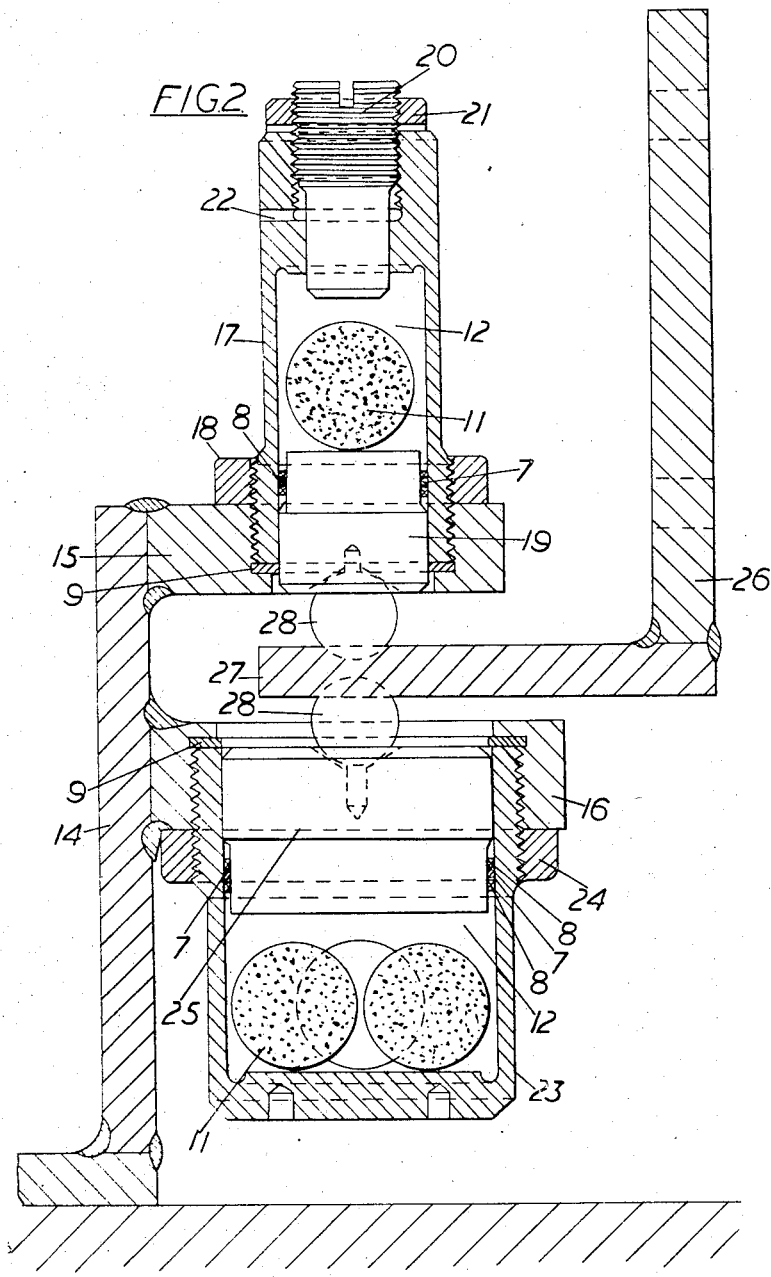

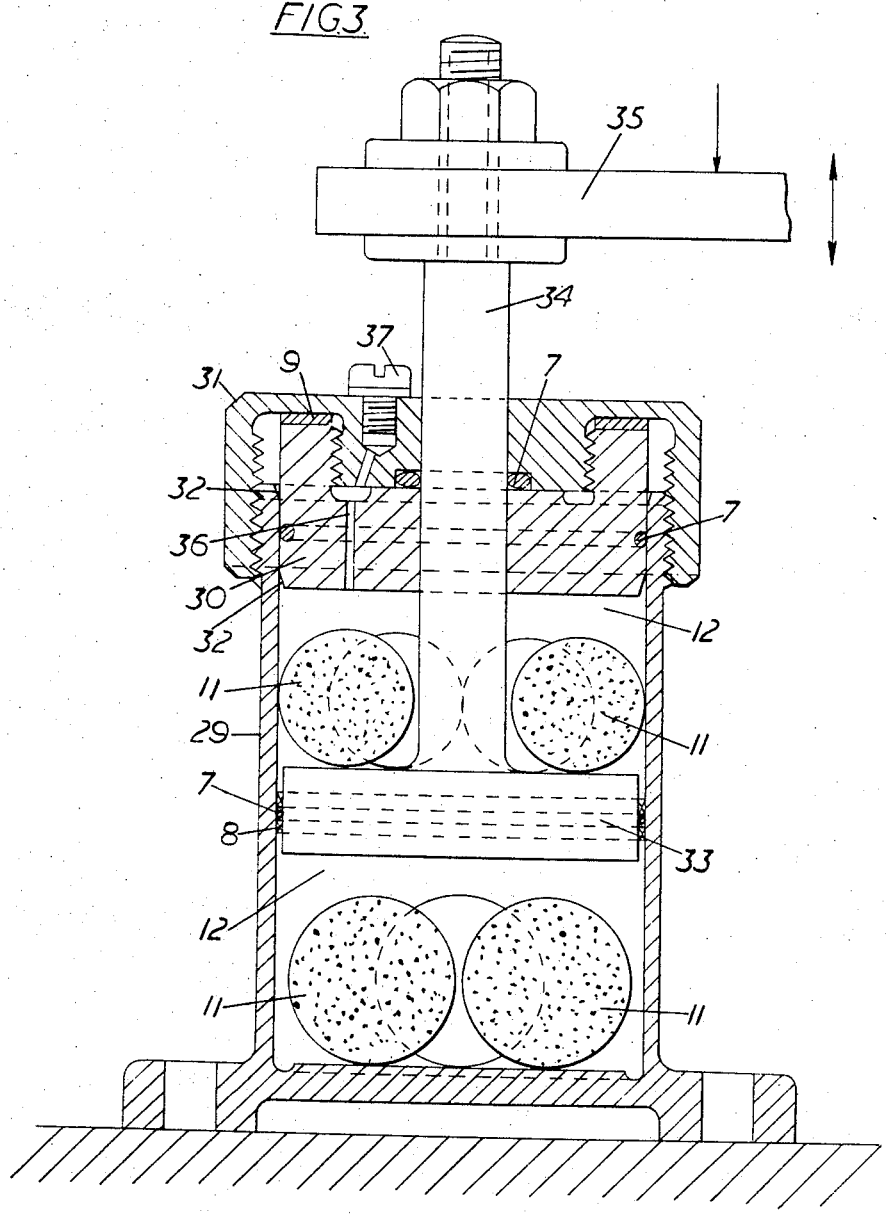

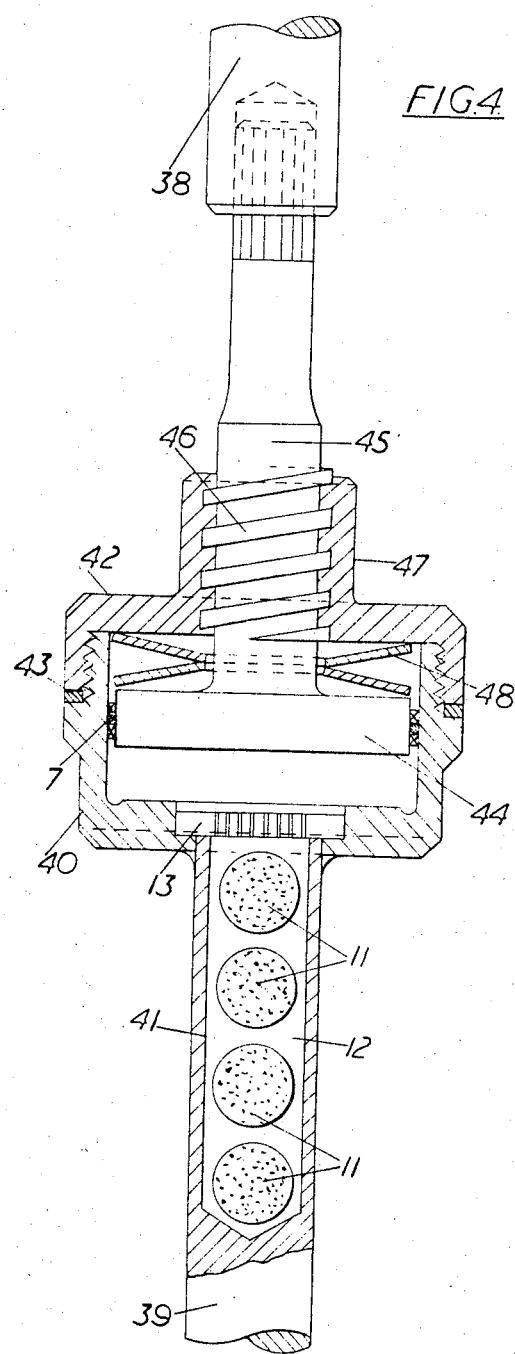

Jan. 28, 1969  F. T. CHAK MA  3,424,448
SPRINGS AND/OR SHOCK ABSORBERS
Filed June 6, 1966
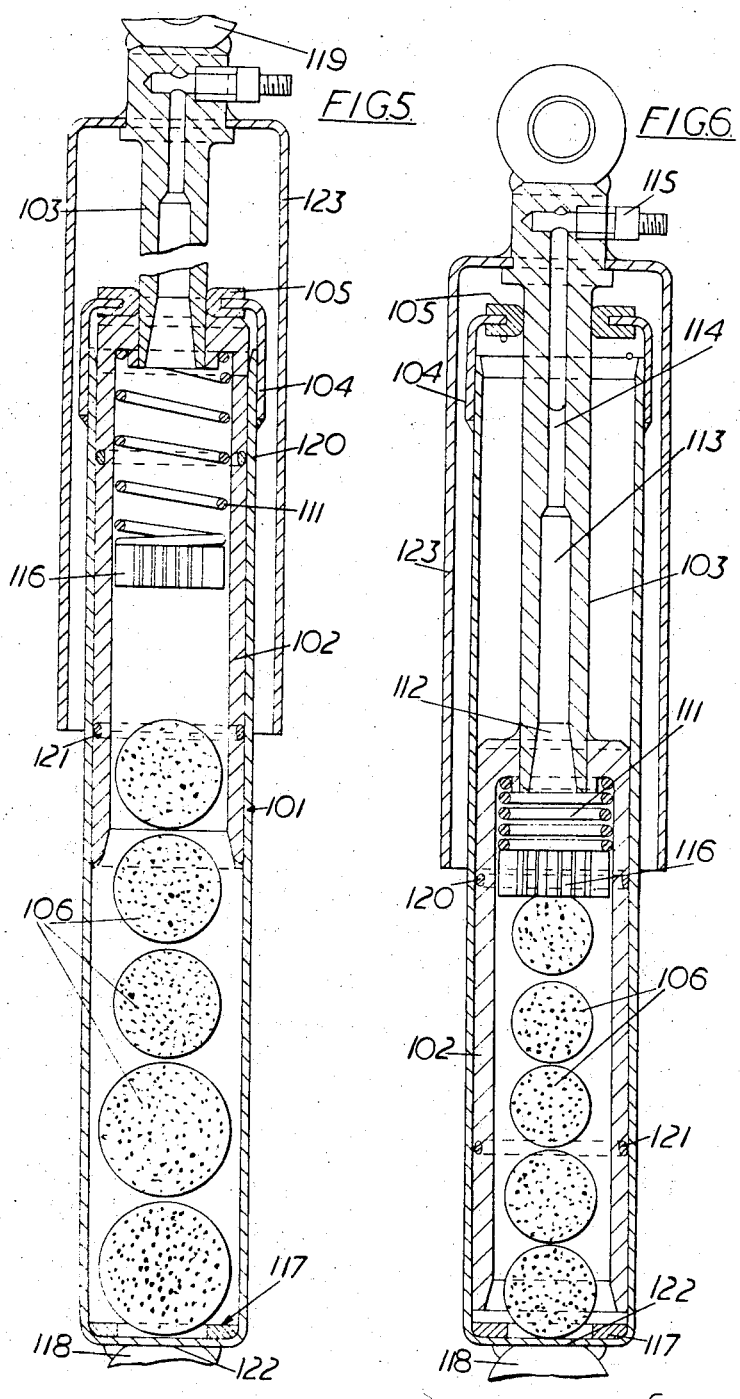
Inventor
FRANCIS TIN CHAK MA
By Irwin S. Thompson
Attorney United States Patent Office 3,424,448
Patented Jan. 28, 1969

3,424,448
SPRINGS AND/OR SHOCK ABSORBERS
Francis Tin Chak Ma, 33 Village Road,
London, N.3, England
Filed June 6, 1966, Ser. No. 555,403
Claims priority, application Great Britain, June 18, 1965,
25,858/65; May 17, 1966, 21,923/66
U.S. Cl. 267—35
Int. Cl. B60g 11/02, 11/26; F16f 1/18

9 Claims

ABSTRACT OF THE DISCLOSURE

A spring device or shock absorber comprises one or more spheres of micro-cellular resilient material immersed in oil in a chamber provided with a piston by which the forces to be taken up or absorbed are applied, and a sintered porous partition serves to damp out movements and vibrations of the oil in the chamber. The spheres are provided with an oil-resistant coating. The piston may be moved axially by an axially-applied force, or by a torque applied by screw means. The damping partition may be movable within the chamber, and may have an applied spring load. The resilent spheres may be of different sizes.

Figure 1:
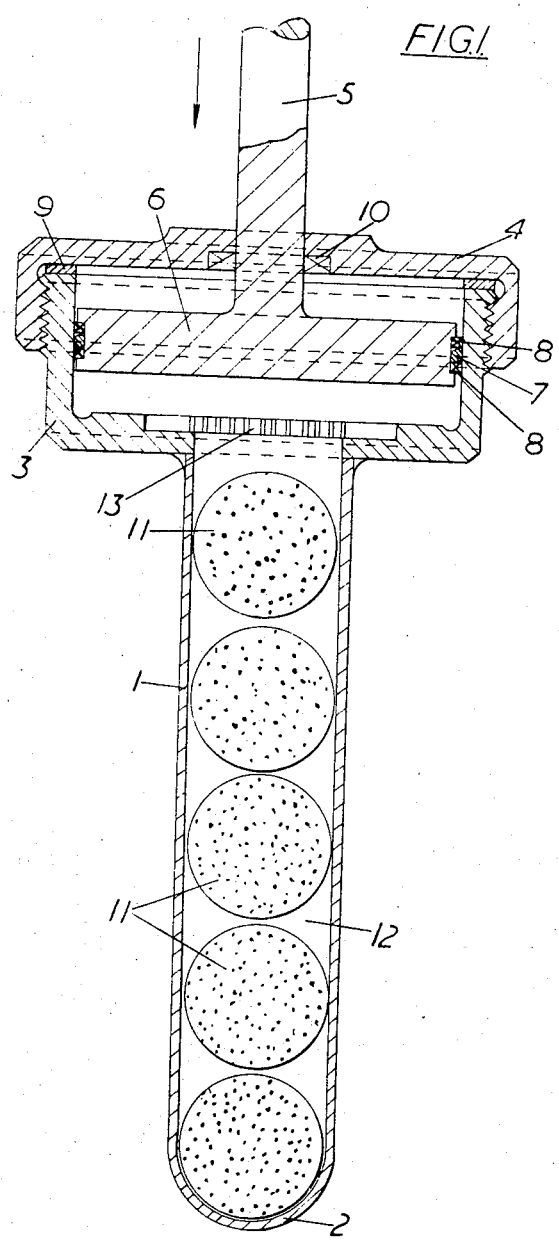

This invention relates to springs and/or shock absorbers, and aims at the provision of a spring and/or shock absorber which will absorb a large amount of energy, and thereby serve as a support and/or counter-oscillation device for a load applied to it.

The invention consists in a spring and/or shock absorber device comprising a casing enclosing a fluid having immersed therein one or more compressible bodies formed of resilient material, such as rubber or a synthetic elastomer, and means for applying to the fluid a force or vibration which the spring and/or shock absorber is intended to take up.

In preferred forms of the invention compressible balls, e.g., of micro-cell rubber, are immersed in oil or other suitable liquid in a casing provided with means for applying the load to the liquid, which thereupon compresses the balls. The characteristics of the spring and/or shock absorber are determined by the number and dimensions of the balls and other components, and of the material from which they are formed. It is preferred that the load-strain curve of a spring and/or shock absorber in accordance with the invention shall be nonlinear, such that its elastic modulus increases rapidly with strain. Dampening means may be provided in a spring and/or shock absorber in accordance with the invention.

The invention will be clearly understood from the following description of forms (given, however, merely by way of example) which it may assume, and this description will be more readily followed by reference to the accompanying drawings wherein FIGURES 1, 2, 3 and 4 represent in side sectional elevation four modifications of a spring and/or shock absorber in accordance with the invention: and FIGURES 5 and 6 represent in side sectional elevation another form of spring and/or shock absorber in accordance with the invention, respectively in fully extended and fully compressed positions.

In carrying the invention into effect in one convenient manner, as shown in FIGURE 1 of the aforesaid drawings, a spring and/or shock absorber, comprises a thin-walled cylinder 1 of steel or other suitable metal closed at one end, 2. At the other end is an enlarged compartment 3, integral with or secured, e.g., by welding, to the cylinder 1. A flanged cover or cap 4 is provided to screw on to the compartment 3 in order to close it. A central bore in the cover 4 forms a bearing in which can slide the rod 5 of a piston 6 slidable in the compartment 3. The piston 6 is sealed in the compartment by an encircling O-ring 7 reinformed on each side by plastic rings 8. A sealing gasket 9 is fitted between the cover 4 and the rim of the compartment 3, and a mechanical seal 10 is fitted round the piston rod 5 in the roof of the cover 4.

In the cylinder 1 are housed a plurality of compressible balls 11, formed of micro-cell rubber or elastomer core, with an outer protection layer of oil-resistant synthetic rubber or plastic such as neoprene, nitrile rubber, polyurethane, silicone or others, and the space beneath the piston 6 is completely filled with oil 12 in which the balls 11 are thus immersed. The space above the piston 6 is filled with air which may be introduced, pre-compressed via a nipple to form an air cushion.

The load or oscillatory force which the device is to take up is applied by suitable means to the piston rod 5, tending to depress the piston 6 in the compartment 3, with the result that the balls 11 become compressed by the oil 12, and owing to their resilient nature the balls provide a "spring" effect. It can be shown that the device affords a non-linear load-strain characteristic, and has an anti-resonant amplitude-limited response.

If resired, a perforated plate 13 may be fitted in the base of the compartment 3 over the mouth of the cylinder 1, to provide partial obstruction to the flow of oil and thus impose a damping effect.

One form of anti-vibration support in accordance with the invention is shown in FIGURE 2 of the aforesaid drawings. A base bracket 14 has two spaced platforms 15, 16 extending substantially horizontally therefrom. In the upper platform 15 a bore is screw-threaded in its upper portion, and a chamber 17 screws into it from above, and is held by a lock-nut 18. A piston 19 with a sealing O-ring 7 is slidable in the lower end of the chamber 17, and a ball 11 is immersed in oil 12 which substantially fills the chamber 17. In a screw threaded bore in the upper end of the chamber 17 is screwed an adjustable plug 20 held by a locknut 21. An air and oil drainage channel round the plug 20 communicates with atmosphere at 22. The plug 20 allows adjustment, as desired, of the pressure inside the chamber 17.

A similar arrangement is fitted in the lower platform 16. A chamber 23 closed at its lower end screws from beneath into the screw-threaded lower portion of a bore in the platform, and is held by a lock-nut 24. A piston 25, with sealing means 7, 8, slides in the upper end of the chamber 23 and encloses in the chamber a plurality of balls 11 immersed in oil 12.

A bracket 26 to support a load( e.g. an engine bracket) is formed on one limb 27 with recess to receive steel balls 28 above and below it, and these balls seat respectively in recesses found in the exposed faces of the pistons 19 and 25. The load is thus supported on the brackets 26 between the balls 28 which are resiliently suspended by the hydraulic ball assemblies in the chambers 17 and 23, and the load and/or vibrations applied in a vertical direction to the bracket 26 are thus taken up.

In FIGURE 3 of the aforesaid drawings is shown a double-action spring or anti-vibration support. A cylindrical casing 29 closed at the bottom has fitted into its open end a slidable pre-compression piston 30 held down by an end cover 31 screwed externally on to the casing 29. The inner edge of the mouth of the casing 29, and the lower peripheral edge of the piston 30 are formed with a 10° chamfer, as at 32. A piston 33 slidable in the casing 29, and sealed by a ring 7 had a rod 34 slidable through a bore in the cover 31, through which it extends, to have attached to its upperend a load-bearing beam or platform 35. Sealing O-rings 7 are provided between the pre-compression piston 30 and the casing, and between the piston 30 and cover 31. A duct 36 through the piston 30 and cover 31 is closed at its outer end by a screw with washer 37 removable to bleed off air and/or oil. Each space within the casing, both above and below the piston 33 is filled with oil 12 in which are immersed a plurality of compressible balls 11 as previously described.

A form of shock-absorber and/or spring applicable to the torsional transmission of forces or vibration is illustrated in FIGURE 4 of the aforesaid drawings, where it is shown as a coupling between a driving shaft 38 and driven shaft 39. A cylindrical compartment 40 is secured e.g. by welding, to the end of the driven shaft 39 which at its end is axially bored to form a cylindical chamber 41. A cover 42 screws externally on to the compartment 40, and is sealed by a gasket 43. A piston 44 slidable in the compartment 40 has a rod or shaft 45 formed with a square-section external screw thread 46 which co-operates with a like-sectioned internal screw-thread in a boss 47 of the cover 42. The other end of the rod or shaft 45 is splined in a bore in the end of the driving shaft 38. The enclosed space between the piston 44 and the driven shaft 39 is filled with oil 12, in which compressible balls 11 are immersed in the tubular bore of the shaft 39. If desired a perforated plate 13, as previously described may be fitted over the top of the tubular bore of the shaft 39. Between the piston 44 and the cover 42 are fitted conical annular spring plates 48 bearing on the piston to provide pre-compression of the oil 12 and balls 11. By virtue of the screw threads 46 rotational forces applied to the shaft 45 by the driving shaft 38 tend to cause axial movement of the piston 44 in the compartment 40, and the forces and/or vibrations are taken up by compression of the oil and ball assembly in the driven parts 40, 39.

It will be seen from the above description that a simple, cheap and efficient spring is made available. Inexpensive materials, such as cast iron or mild steel, rubber and oil may be used, and the construction is reliable and fool proof. If the balls 11 should fail no catastrophe ensues. Damping is easily provided (by the perforated plate), and may be varied by using plates with holes of different sizes and/or numbers. The characteristic load-strain curve may be selected to meet specific requirements by choice of appropriate values for the following factors:

(a) Ratio of diameters of a ball and its casing;

(b) Size of a micro-cell in relation to the diameter of a ball;

(c) The number of micro-cells per unit volume of a ball;

(d) The composition of the rubber or elastomer from which a ball is made;

(e) The thickness and/or material of the protective coating in relation to the diameter of a ball;

(f) The number of balls used in a spring unit, having regard to the volume of oil in which they are immersed.

It can be shown that advantages arise from the use of spherical balls as the compressible bodies immersed in the oil or other fluid, but it should nevertheless be understood that it is within the scope of the invention to use bodies of other shapes, e.g. cubes, short cylinders or ovoids.

It will also be noted that attention to design details, according to requirements, assist in ensuring that the spring will have desired characteristics. Thus in FIGURE 1 when the spring is used as an impact shock absorber, and only a short stroke is required but very heavy load is expected, the principle of differential hydraulic cylinder is made use of. Therefore, it results in a design which has a piston diameter much larger than the cylinder diameter which holds the elastic balls. This would give sufficient pressure reduction on the balls, or load carrying capacity amplification on the piston side. The perforated viscous damping plate hinders the transmission of oil and pressure from one side to the other, giving very good damping effect. Therefore, some of the impact energy would appear as heat in the oil without going all into the rubber balls.

In FIGURE 2, the perforated plate is not required, because when used as engine mounts, where the load application is not sudden, the elastic spheres should respond to the vibrational amplitude in terms of immediate change in volumetric strain. At the point of contract with the engine mounting bracket, steel ball bearings are used to accommodate slight movement due to engine yaw and roll. Engine vibration is three dimensional, i.e. has more than one degree of freedom. The suggested ball contact would transform all movement of the engine into movement along the non-linear spring axis. In all cases when no damping plate is used, immediate response of the rubber to compression can be safely assumed because of the non-compressibility effect of the oil.

In FIGURE 4, it is possible to replace the splined shaft with a driving pin sliding along slots on the driving shaft. The square thread may also be replaced by helical ball bearing channels to reduce friction.

In the forms of the invention described above various detail modifications may be incorporated as desired. Thus there may be incorporated in the cap 4 of FIGURE 1 a nipple with a ball valve or other non-return valve allowing the "spring" to be pre-compressed by injecting air under pre-arranged pressure. Similar valves may be provided in the chambers 17 and 23 (FIGURE 2), the casing 29 (FIGURE 3) or compartment 40 (FIGURE 4) to allow pumping in of oil to a desired pressure for pre-compression of the spring. With this arrangement the lengths of the plug 20 (FIGURE 2) and/or the piston 30 (FIGURE 3) may be reduced, (which will allow another ball, or layer of balls, 11 to be accommodated if desired). In order to avoid leakage the surfaces of the pistons 19 and 25, and the plug 20, and the wall surfaces of the chambers 17 and 23 which they slidably cooperate, should be smoothly finished, e.g. by grinding, lapping or micro-finish techniques. If the expense of such an operation is to be avoided a sealing O-ring may be fitted, e.g. round the plug 20. In some cases the steel balls 28 (FIGURE 2) may be rigidly attached to the pistons 19 and 25, e.g. by welding. With a view to reducing the cost of a perforated plate 13, it may be replaced by a plate of high porosity prepared by powder metallurgy, using metal powder and ceramic materials.

A further form of spring and/or shock absorber in accordance with the invention is illustrated in FIGURES 5 and 6 of the aforesaid drawings, and comprises a thin walled cylinder 101 of steel or other suitable metal or alloy, closed at one end 122. At the other end is a metal cap 104, having a central bore ringed by the U-sectioned P.T.F.E. rubber washer 105, the whole is secured e.g. screwed or spot welded or bonded by an adhesive on to the top of the open end of the cylinder 101 in order to close it. This central bore together with the rubber washer 105 forms a bearing or guide through which can slide a steel or alloy tube 103 of cup-piston 102. Tube 103 and cup-piston 102 can be welded, pressed, or screwed together. There are two rubber O-rings, preferably made of P.T.F.E. or other suitable synthetic materials, namely, 120 and 121, embedded in the two peripheral grooves of the external surfaces of the cup-piston 102 to stop any oil leakage from the cylinder. Split piston rings made of synthetic plastic materials are used on both sides of the O-rings in order to reinforce it if necessary.

In the cylinder 101 are housed a plurality of compressible balls 106, of various diameters, formed of micro-cell rubber, or elastomers or any other suitable compressible plastic materials having cellular or sponge structure of comparatively high thermal conductivity. The rubber spheres or balls are coated with a layer or skin of oil-resisting rubber of suitable thickness, (which may be natural or synthetic such as neoprene, nitrile rubber, polyurethane, silicone rubber or chlorohydrins and others). There should always be a small clearance space between the balls 106 and the inner circumference of the cup-piston 102, after allowing for slight swell of the rubber after prolonged immersion in the oil as well as expansion due to thermal effects. The chamfer at the inner edge by the mouth of the cup-piston should be adequate to facilitate ease of entry by the balls which would be automatically centralized as the cup-piston moves downwards.

The ball diameters are intended to decrease by at least one third as the oil pressure reaches its maximum value. A damping piston 116, fixed or slidable, is made of either perforated metal plate, metal and/or alloys of porous structure produced by modern powder metallurgical technique. Porosity can be controlled during the sintering stage. Alternatively, the porous damping plate located in the central portion of the piston need not be entirely metallic; it may be made of cement, refractories, suitable ceremic or even glass materials as long as sufficient strength and rigidity, together with suitable porosity, is achieved.

One or two springs such as 111, of the same or unequal stiffness, may be secured on to one or both sides of the damping piston 116, if slidable. The other end or ends of the spring or springs, having the last coil suitably made smaller than the outer diameter of the piston rod locating boss or housing, may be pressed into position so that a firm grip is obtained on the moving member such as the cup-piston 102 by the expansion of the last coil of the spring 111. Alternatively the spring 111 may be positively secured to the piston 102. The length of the spring 111 when fully compressed should be longer than the length of the piston rod locating boss so that the damping piston 116 can never be damaged by it even on overload. When the cup-piston 102 is approaching its lowest position, the rubber balls 106 are entirely housed inside the cup-piston 102 and may be slightly staggered because of their reduced diameters, but their total height, corresponding to the existing oil pressure surrounding them, should be such that the top ball begins to cover up part of the porous area of the damping piston. This particular design features gives increased damping from this point onwards because of a rapid increases of resistance or restriction to oil flow. This increased damping together with the rapidly rising elastic modulus of the balls will ensure against any damage to the shock absorber due to "bottoming" as a result of overload by sudden dynamic impact. If the cup-piston really hits the bottom which should rarely occur, with this design, two oil resistance rubber or plastic washers 117 and 105 are provided for cushioning the effect.

The design of the piston rod which is in fact a tube of changing cross-sectional area, has already been described. The drawing attached shows a convenient form of large scale manufacture, and yet can give a good approximation to the desired non-linear load-strain characteristics.

An alternative design uses a compound tube such that the piston rod 103 can be made of an external thin wall tube and an inner tube pressed in, made in large quantities by the method of pressure die-casting of aluminium or its alloys. This can give a very smooth and gradual variation in cross sectional area of the inner compression channels, 112, 113, 114, aiming at a gradual and smooth rise of compression ratio all the way. The valve 115 is of suitable, simple design such that it can withstand high pressures repeatedly for long periods without appreciable leakage, i.e. reliable and yet cheap. Loading lugs 119 and 118 are welded on to one end of the piston rod 103 and the closed end of the cylinder 101 respectively. A cup-shaped housing 123 is welded or secured onto the piston rod 103 near the top end below the valve 115, protects the smoothly finished (usually by cylindrical surface grinding) surface of the piston rod 103.

In a modification of the form of the invention described with reference to FIGURES 5 and 6 there may be provided some small holes in cap 104 above the opening of cylinder 101 for additional air damping during both the upward and downward stroke.

In this last-described form of the invention the gas enclosed in the cylinder 101 above the damping piston 116 may be carbon dioxide, nitrogen, hydrogen or any other suitable gas. There may be provided (and in some circumstances there will clearly be present), in the space above the damping piston 116 a measure of oil, as well as the gas.

When the damping piston 116 is slidable in the cylinder it may reciprocate or oscillate in the cylinder when the device is in operation under variable load. It may oscillate in phase or out of phases with the cup-piston or the shock absorber casing depending again on specific application. When they oscillate out of phase, the phase angle may be positive or negative and may change from zero to 180 degrees depending on the viscosity of the oil, the number and sizes of the holes or porosity in and through the damping piston, the damping piston clearance with the cup-piston, and the spring stiffness, and of course, the amplitude and frequency of the applied vibrational load on the shock absorber.

In motor car applications, it is preferred that the following damping conditions be aimed at as the most effective:

(1) Starting from equilibrium position, downward stroke—no damping;

(2) Beginning of return stroke upward: Shock absorber damping+spring load on wheel is proportional to 1 $g$, where $g$ is the gravitational constant;

(3) Upward stroke approaching equilibrium position: damping must be very small or nearly zero;

(4) Upward stroke from equilibrium: zero damping;

(5) Beginning of return stroke downward: Spring load on wheel—shock absorber damping is proportional to 1 $g$, where $g$ can be taken as 32.2 ft./sec./sec.;

(6) Downward stroke on approach to equilibrium position: damping again should be small or almost zero.

The most promising choice of the phase angle is that which results in the damping piston lagging behind the shock absorber casing by 90 degrees or in other words, by 270 degrees in relation to the cup-piston.

If the vehicle vibration can be assumed to be substantially simple harmonic, and that viscous damping force is proportional to oil flow velocity through the small holes in the damping piston, this 90 degree lag will give maximum damping when the vibrational amplitude of the vehicle wheel is also at its maximums, and zero damping at the equilibrium position.

As previously stated, it is preferred that the load-strain curve of the spring and/or shock absorber in accordance with the present invention shall be non-linear, such that its elastic modulus increases rapidly with strain so as to retain its special and unique anti-resonance properties at all frequencies. To this end, certain matching conditions should be satisfied. As the load is increased on the cup piston, the gas, the compressible balls, and the oil are all under compression. Both the volume of the gas and that of the balls will contract.

Oil will rush through the porosities in the damping piston into the gas chamber because the gas pressure will be less than the oil pressure due to the fact that the spring has taken up part of the load.

Inside the gas chamber, the oil level is rising at a rate more or less proportional to the rate of oil displacement by the cup-piston until it reaches the entry to the channel inside the piston rod.

The situation is equivalent to that when a gas is being compressed by a hydraulic piston, as the channel inlet diameter is much smaller than the gas chamber diameter, the oil level must then rise much faster inside the channel per unit displacement of the cup-piston. This can only mean that the compression ratio of the gas per unit cup-piston displacement has been stepped up once the oil passes the channel inlet point. As the cross sectional area of the channel is gradually reduced, a continuous increase of the compression ratio is achieved. This makes it possible to match either exactly or approximately the gas pressure versus cup-piston displacement curve with that given by the hydraulic oil pressure on the other side so that the all important and much desired non-linear load-strain characteristic of the shock absorber can be preserved. The rate of increase of the elastic modulus of the shock absorber to a certain extent depends on the cross sectional profile of the channel. The initial gas pressure level can be adjusted by pumping different quantity of gas or air into the gas or air chamber through the car tire valve at the top end of the piston rod, so that the shock absorber will not be working at that portion of its power absorption curve at which a long travel of the piston only corresponds with a small absorption of shock energy and at the same time, to counter the oscillation of the vehicle, or other load.

Since the oil above the damping piston is not subjected to direct sudden dynamic load, but only follows the movement of the damping piston which oscillates with much smaller amplitude than the absorber casing, and certainly with much less vigor, and when it emerges out of the small holes, its velocity is not high, and it is therefore easily dispersed. This is because most of the kinetic energy of the oil has already been dissipated through viscous friction. It follows that aeration problem of the oil which may decrease damping efficiency will not occur.

Furthermore, as the initial tapering section and the middle section of the compression channel above the gas or air chamber are not too narrow, air locking problems do not occur. As the smaller cross section of the compression channel is well situated further to the top, the very high pressure air or gas, on expansion when the load is released will always be able to push all the oil out and thereby clear its passages.

It is also understood that the micro-cell rubber balls will not heat up to any appreciable extent because now they are resilient and capable of returning to their initial density when the pressure is reduced such that they function mainly as an energy storage device and not an energy dissipation device. The balls merely cushion any sudden impact load on the wheel of the vehicle.

This impact energy is dissipated in several ways:
(a) By the oil moving through the oscillating porous damping piston.
(b) By compressing the gas or air, the heat thereby generated in the process can easily be transferred through the metallic tube wall of the cup-piston rod. When the vehicle is moving, the piston rod protecting cap welded near the top end of the rod will give extra cooling area.
(c) Heat generated by friction between the cup-piston and the absorber casing can be lost through the casing itself which is being cooled by the wind.

It should be understood that the invention is not limited solely to the details of the form described above, which may be modified, in order to meet various conditions and requirements encountered, without departing from the scope of the invention.

What I claim is:

1. A shock-absorber comprising a cylindrical casing containing liquid, a plurality of compressible solid spheres of micro-cellular resilient material immersed in said liquid, a tubular piston open at one end and closed at the other end slidable in said cylindrical casing for applying to said liquid, and thereby to said spheres, the force which the shock-absorber is to take up, a gas-filled tubular operating rod connected to the closed end of said tubular piston, and in communication with the interior of said piston, and a liquid-permeable damping plate, constituting a partition within said casing, adapted to damp out movements of the liquid therein.

2. A shock-absorber according to claim 1 wherein said tubular operating rod includes lengths of successively reduced internal diameter.

3. A shock-absorber according to claim 1 comprising a valve at the upper end of said operating rod allowing a gas to be introduced into or removed from the bore of the rod.

4. A shock-absorber according to claim 1 comprising a sealing means surrounding the end of the cylindrical enclosure, through which said rod passes.

5. A shock-absorber according to claim 1 wherein the damping plate is slidable within said piston and is loaded by spring means on one side.

6. A shock-absorber according to claim 1 wherein immersed in said fluid are a plurality of resilient spheres of progressively varying diameters.

7. A shock-absorber comprising a cylindrical casing closed at one end and open at the other end, a piston slidably fitted into said cylindrical casing open at its inner end and closed at its outer end, a gas-filled hollow tube connected to the closed end of said piston and communicating through said closed end with the interior of said piston, liquid partially filling the closed space between said casing and said cylinder, a plurality of solid spheres of micro-cellular resilient material immersed in said liquid, the outer surface of each of said spheres being resistant to deleterious action by said liquid, and a spring-loaded damping partition, permeable to said liquid, movably housed within said piston.

8. A shock-absorber according to claim 7 comprising a cover on the open end of said cylindrical casing provided with an aperture through which passes said hollow tube, and resilient washer means fitted in said aperture and bearing against said hollow tube.

9. A shock-absorber according to claim 7 comprising a cup-shaped housing secured to said hollow tube at a point remote from said piston, and surrounding said hollow tube as a protective cover.

References Cited

UNITED STATES PATENTS

| | | | |
|---|---|---|---|
| 3,194,355 | 7/1965 | Jeromson | 267—64 X |
| 3,290,037 | 12/1966 | Robinson et al. | 267—64 |
| 3,302,940 | 2/1967 | Wain | 188—100 |
| 1,029,462 | 6/1912 | Rife | 267—35 |
| 2,201,912 | 5/1940 | Morgan. | |
| 2,320,314 | 5/1943 | Trask | 267—34 X |
| 2,350,989 | 6/1944 | Craig. | |
| 2,701,714 | 2/1955 | Harwood. | |
| 2,793,031 | 5/1957 | Hartel | 267—64 |
| 3,285,596 | 11/1966 | Burgert | 267—64 |

FOREIGN PATENTS

| | | |
|---|---|---|
| 750,522 | 6/1956 | Great Britain. |

GEORGE E. A. HALVOSA, *Primary Examiner.*

U.S. Cl. X.R.

267—64; 188—88, 100